(12) United States Patent
Decker

(10) Patent No.: US 7,072,874 B1
(45) Date of Patent: Jul. 4, 2006

(54) OPTIMIZATION OF TRAINING SETS FOR NEURAL-NET PROCESSING OF CHARACTERISTIC PATTERNS FROM VIBRATING SOLIDS

(75) Inventor: Arthur J. Decker, North Olmstead, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 646 days.

(21) Appl. No.: 10/404,725

(22) Filed: Apr. 1, 2003

Related U.S. Application Data

(60) Provisional application No. 60/404,222, filed on Jul. 23, 2002.

(51) Int. Cl.
*G06F 15/18* (2006.01)
*G06E 1/00* (2006.01)

(52) U.S. Cl. ..................................................... 706/25
(58) Field of Classification Search ................. 706/25, 706/16
See application file for complete search history.

(56) References Cited

U.S. PATENT DOCUMENTS

| | | | |
|---|---|---|---|
| 5,355,528 A | 10/1994 | Roska et al. | |
| 5,371,834 A | 12/1994 | Tawel | |
| 5,416,616 A * | 5/1995 | Jenkins et al. | ................. 359/11 |
| 5,428,466 A * | 6/1995 | Rejman-Greene et al. | .... 359/15 |
| 5,465,620 A | 11/1995 | Sanderson et al. | |
| 5,490,062 A | 2/1996 | Leach et al. | |
| 5,631,469 A | 5/1997 | Carrieri et al. | |
| 5,774,376 A * | 6/1998 | Manning | ...................... 702/56 |
| 5,813,406 A | 9/1998 | Kramer et al. | |
| 6,060,710 A | 5/2000 | Carrier et al. | |
| 6,070,098 A * | 5/2000 | Moore-Ede et al. | ......... 600/544 |
| 6,268,920 B1 * | 7/2001 | Ohlig | .......................... 356/401 |
| 6,574,754 B1 * | 6/2003 | Smith | .......................... 714/47 |
| 6,941,026 B1 * | 9/2005 | Nadabar et al. | ............. 382/265 |

FOREIGN PATENT DOCUMENTS

JP          06-180602          *  6/1994

OTHER PUBLICATIONS

Arthur J. Decker, "Training Data Optimized and Conditioned to learn Characteristic Patterns of Vibrating Blinks and Fan Blades", 2000.*

Arthur J. Decker, "Vibrational Analysis of Engine Components Using Neural-Net Processing and Electronic Holography" 90th Symposium Cosponsored by The Advisory Group for Aerospace Research and Development and the Propulsion and Energetic Panel, Oct. 1997.*

(Continued)

*Primary Examiner*—George Davis
(74) *Attorney, Agent, or Firm*—John P McMahon; Kent N. Stone

(57) ABSTRACT

An artificial neural network is disclosed that processes holography generated characteristic patterns of vibrating structures along with finite-element models. The present invention provides for a folding operation for conditioning training sets for optimally training forward-neural networks to process characteristic fringe patterns. The folding pattern increases the sensitivity of the feed-forward network for detecting changes in the characteristic pattern. The folding routine manipulates input pixels so as to be scaled according to the location in an intensity range rather than the position in the characteristic pattern.

34 Claims, 13 Drawing Sheets

OTHER PUBLICATIONS

Arthur J. Decker, "Model-Trained Neural Network and Electronic Holography Demonstrated to Detect Damage in Blades", NASA, 1997.*

Kutanov et al, "Holographic-Disk-Based Optical Neural Network", Optics Letters, vol. 7, No. 13, Jul. 1, 1997.*

* cited by examiner

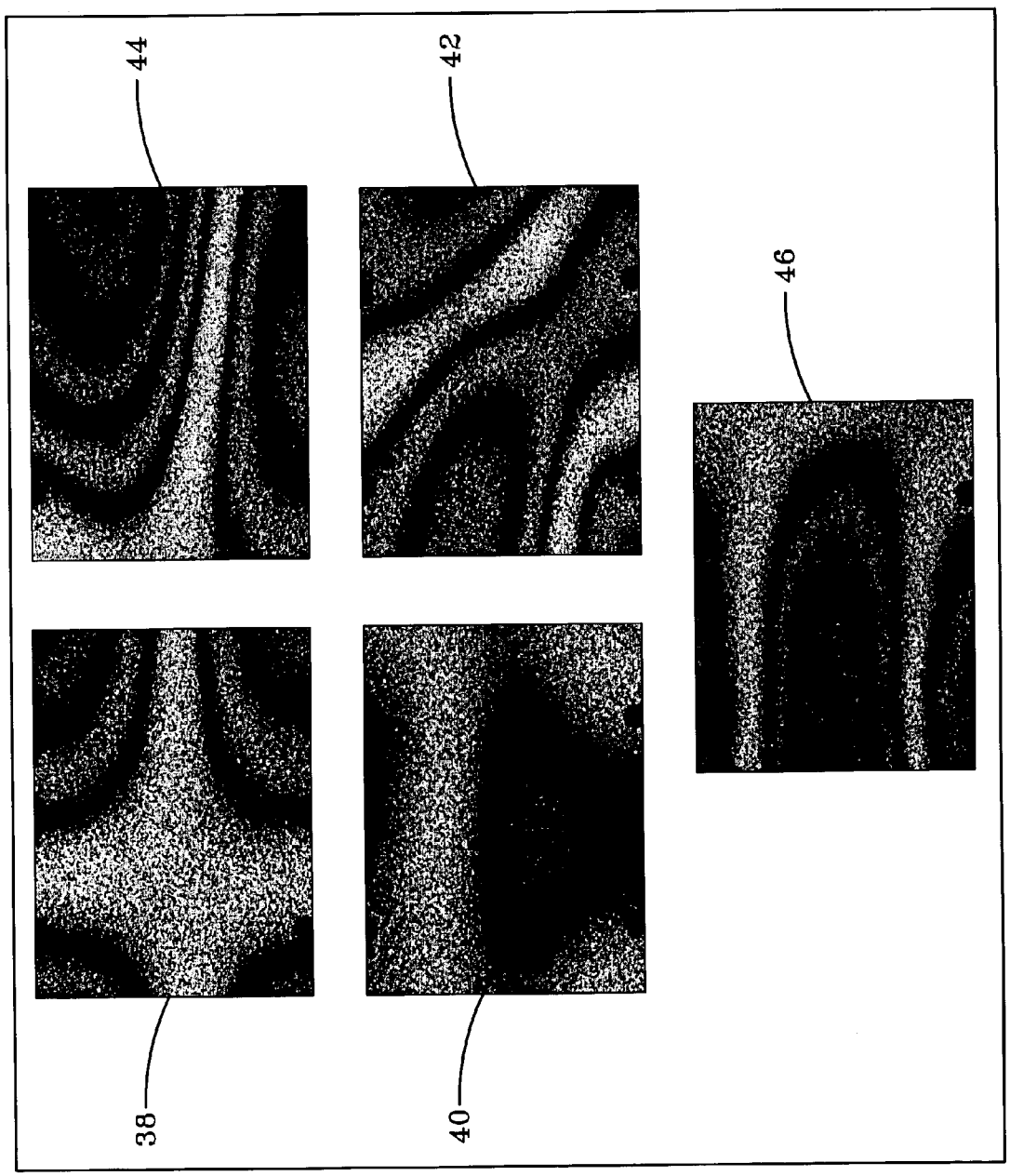

OPTIMIZATION OF TRAINING SETS FOR NEURAL-NET PROCESSING OF CHARACTERISTIC PATTERNS FROM VIBRATING SOLIDS

CROSS-REFERENCE TO RELATED APPLICATIONS

This application continues the prosecution of U.S. Provisional Application Ser. No. 60/404,222 filed Jul. 23, 2002.

ORIGIN OF THE INVENTION

The invention described herein was made by an employee of the United States Government and may be used by or for the Government for governmental purposes without payment of any royalties thereon or therefor.

FIELD OF THE INVENTION

The invention relates to the detection of faults in a vibrating solid and, more particularly, to a method using an artificial neural network for detecting damage of a vibrating solid. Specifically, the invention relates to detecting damage of the vibrating solid by the use of a folding technique that operatively cooperates with the neural network to increase the sensitivity for detection of flaws in the vibrating solid, such as a turbine blade.

BACKGROUND OF THE INVENTION

Artificial neural networks consist of a set of elements that start out connected in a random pattern, and, based upon operational feedback, are molded into the pattern required to generate the desired results. Artificial neural networks are used in applications such as robotics, diagnosing, forecasting, image processing and pattern recognition.

Artificial neural networks, sometimes simply referred to as neural networks, are neurons or processing elements (PEs) grouped in input, hidden, and output layers that communicate in parallel via full interconnections of PEs between layers. The strengths of interconnections are called weights. In training sessions of a network, learning is composed by a training algorithm and paradigm, causing pattern updated adjustments in weight strengths. The training algorithm preferably used herein is called Backward-Error Propagation (BEP), (sometimes referred to as back-propagation) a method of error analysis where perturbations put on the weights are distributed in a manner to reduce overall network epoch error. All weights of the network are dimensions in the domain of the BEP transform (weight space). The learning paradigm (convergence to a correct result) uses a gradient descent method for seeking global minima in this weight-dimensional space.

The network topology is disorganized before training; neural pathways are randomized with no associative learning. Training data consists of the use of characteristic patterns of the object or objects being analyzed. The goal of the network is to associate each class of characteristic patterns to a defined representation. Learning by the network is complete when error in the defined representation is less than a pre-specified small number. A typical number is less than 1% of the defined representation. At this condition the network has converged yielding an answer.

A training record associated with the training of a neural network consists of an input and an output. The input is a characteristic pattern recorded of a vibrating structure excited to vibrate at very low amplitude. The structure is excited to vibrate in a normal or resonant mode, and the characteristic pattern shows the mode shape. In one method, a characteristic pattern is generated using electronic or television holography. Television holography is available commercially in more than one form, and is discussed extensively in the literature.

Neural network processing of characteristic patterns of vibrating structures is used routinely for non-destructive evaluation. The characteristic patterns are generated using electronic time-average holography of the vibrating structure and are sub-sampled before processing. The lower resolution patterns containing a few hundred to a few thousand pixels are then presented to an experimentally trained neural network. The neural network is trained to detect small changes in the characteristic patterns resulting, for example, from structural changes or damage.

The neural network electronic-holography combination used to detect structural changes and damage has evolved through several stages. One such current combination is experimentally trained and is immune to the laser speckle effect. This combination can be used with cameras that are operated at 30 frames per second and uses feed-forward artificial neural networks (multi-layer perceptrons) very efficiently. The feed-forward architecture, known in the art, is probably the most familiar architecture for so-called artificial neural networks and has many benefits to recommend its usage.

An artificial neural network is sometimes defined to be any processing system that is programmed with a training set of exemplars. As a specific example, the feed-forward neural network (net) remains compact in software as the size of that training set increases; has good noise immunity; and can be trained with straightforward algorithms of the back-propagation genre. The feed-forward net can process fairly large input images, if the number of hidden-layer nodes is not too large, and is well suited to processing speckled characteristic patterns at 30 frames per second when those characteristic patterns contain a few hundred to a few thousand pixels.

Feed-forward artificial neural networks or multi-layer perceptrons, known in the art, do have a reputation at times for being unable to learn training sets that are deemed otherwise to be learnable. Nevertheless, it has been known for some time that the performance of feed forward artificial neural networks can be enhanced greatly by conditioning the inputs. A proprietary functional-link net transforms inputs mathematically, before subjecting them to the back-propagation algorithm. Another practice that improves learning is to scale the individual pixels of the training exemplars to cover the entire input range of the feed forward net. So-called min-max tables of the minimum and maximum pixel values are used for scaling. Learning of characteristic patterns does improve with positional scaling, but the associated neural networks are susceptible to over-training. Furthermore, the associated neural networks often do not achieve the sensitivity desired for non-destructive evaluation procedures. It is desired that the sensitivity of neural networks be improved without suffering the consequences of over-training.

OBJECTS OF THE INVENTION

It is a primary object of the present invention to provide means for neural networks to improve the sensitivity thereof by improving the training thereof so as to allow the neural networks to be trained more easily to detect damage of structures, such as vibrating structures.

It is another object of the present invention to provide for folding routines, which serves to improve the sensitivity of the neural networks.

It is an additional object of the present invention to provide folding routines, which optimizes the performance of feed-forward artificial neural networks for learning and differentiating between the speckled characteristic fringe patterns generated from electronic holograms of vibrating components.

Moreover, it is an additional object of the present invention to provide for a folding routine that allows feed-forward artificial neural networks to achieve the maximum sensitivity in detecting structural damage from changes in the vibration mode shapes visualized with characteristic patterns collected from the entire visible surface of a vibrating structure being analyzed.

It is a further object of the present invention to provide a neural network operatively cooperating with the folding routine and handling structural finite-element models that are combined with models of laser speckle effect and a model of a electronic hologram to generate characteristic patterns, wherein these patterns are used to train artificial neural networks.

SUMMARY OF THE INVENTION

The present invention is directed to artificial neural networks that are used to process holography-generated characteristic patterns of vibrating structures and operatively cooperate with a folding routine which conditions the characteristic patterns of the vibrating structures in the training of the neural network so as to increase the sensitivity of the neural network.

In one embodiment, a method is provided for training an artificial neural network for detecting damage of a vibrating structure. The method comprises the steps of:

a) recording two time-average holograms each comprised of a first number of pixels; (b) providing tiles serving as large pixels predetermined from the geometry of the vibrating structure; c) sub-sampling each of two time-average holograms within the large pixels to extract a second number of pixels for each of the two time-average holograms; d) subtracting corresponding second pixels of each of the two time-average holograms to generate a sub-sampled characteristic pattern; e) delivering the sub-sampled characteristic pattern to a folding routine which scales the second pixels comprising the sub-sampled characteristic pattern in accordance with their location in an intensity range and providing a representative output thereof serving as a training record; f) repeating the steps a), b), c), d) and e) until a predetermined number of training records is obtained; and g) delivering the predetermined number of training records to an artificial neural network for training thereof;

In another embodiment a method is provided for using an artificial neural network for detecting damage of a vibrating structure. The method comprises the steps of:

a) recording two time-average holograms of a vibrating structure serving as a training set and each comprised of a first number of pixels; b) providing tiles serving as large pixels predetermined from the geometry of the vibrating structure; c) sub-sampling each of two time-average holograms of the training set within the large pixels to extract a second number of pixels for each of the two time-average holograms; d) subtracting corresponding second pixels of each of the two time-average holograms of the training set to generate a sub-sampled characteristic pattern; e) delivering the sub-sampled characteristic pattern of the training set to a folding routine which scales the second pixels comprising the sub-sampled characteristic pattern of the training set in accordance with their location in an intensity range and provides a representative output thereof serving as a training record; f) repeating said steps a), b), c), d) and e) until a predetermined number of training set records is obtained; g) delivering the predetermined number of training records to an artificial neural network for training thereof and provides a first representative output therefrom. This method further includes: h) recording two time-average holograms of the vibrating structure serving as a test set and each comprised of a first number of pixels; i) providing the tiles serving as large pixels predetermined from the geometry of the vibrating structure; j) sub-sampling each of two time-average holograms of the test set within said large pixels to extract a second number of pixels for each of the two time-average holograms; k) subtracting corresponding second pixels of each of the two time-average holograms of the test set to generate a sub-sampled characteristic pattern; l) delivering the sub-sampled characteristic pattern of the test set to a folding routine which scales the second pixels comprising the sub-sampled characteristic pattern of the test set in accordance with their location in an intensity range and providing a representative output thereof serving as a training record; m) repeating said steps h), i), j), k), and l) until a predetermined number of test set records is obtained; n) delivering the test set records to the trained artificial neural network to provide a second representative output from the trained artificial neural network; and o) comparing the first representative output with the second representative output to determine if a difference of a predetermined amount exists therebetween, the difference representing detection of damage to the vibrating structure.

In a further embodiment, a method of training is provided for an artificial neural network for detecting damage of a vibrating calculated structure. The method comprising the steps of: a) calculating the characteristic pattern of a vibrating structure and serving as a training pattern; b) delivering the characteristic pattern to a folding routine which scales the pixels comprising the characteristic pattern in accordance with their location in an intensity range and providing a representative output thereof serving as a training record; c) repeating said steps a) and b) until a predetermined number of training records is obtained; and d) delivering the predetermined number of training records to an artificial neural network for training thereof. This calculated characteristic pattern includes a finite-element model, a model of laser speckle effect, and sensitivity vector compensation.

In a still further embodiment, a method is provided for using an artificial neural network for detecting damage of a vibrating structure. The method comprises the steps of: a) calculating the characteristic pattern of a vibrating structure and serving as a training pattern; b) delivering the characteristic pattern to a folding routine which scales the pixels comprising the characteristic pattern in accordance with their location with their location in an intensity range and provides a representative output thereof serving as a training record; c) repeating the steps a) and b) until a predetermined number of training records is obtained; and d) delivering the predetermined number of training records to an artificial neural network for training thereof and providing a first representative output therefrom. This method further comprises: e) calculating the characteristic pattern of a vibrating structure serving as a test pattern of a test set; f) delivering the test characteristic pattern of the test set to a folding routine which scales the pixels comprising the test characteristic pattern of the test set in accordance with their location in an intensity range and provides a representative output thereof serving as a training record; g) repeating said steps e) and f) until a predetermined number of test set records is obtained; h) delivering the test set records to the trained artificial neural network to provide a second representative output from the trained artificial neural network; and i) comparing said first representative output with the second representative output to determine if a difference of a predetermined amount exists therebetween, the difference representing detection of damage to the vibrating structure.

BRIEF DESCRIPTION OF THE DRAWINGS

Features and advantages of the invention, as well as the invention itself, will become better understood by reference to the following description when considered in conjunction with the accompanying drawings, wherein like reference numbers designate identical or corresponding parts thereof and wherein:

FIG. 5 illustrates vibration modes covering a region of a suspicious structural integrity between four boltholes of the associated structure;

DETAILED DESCRIPTION OF THE PREFERRED EMBODIMENTS

Figure 1:
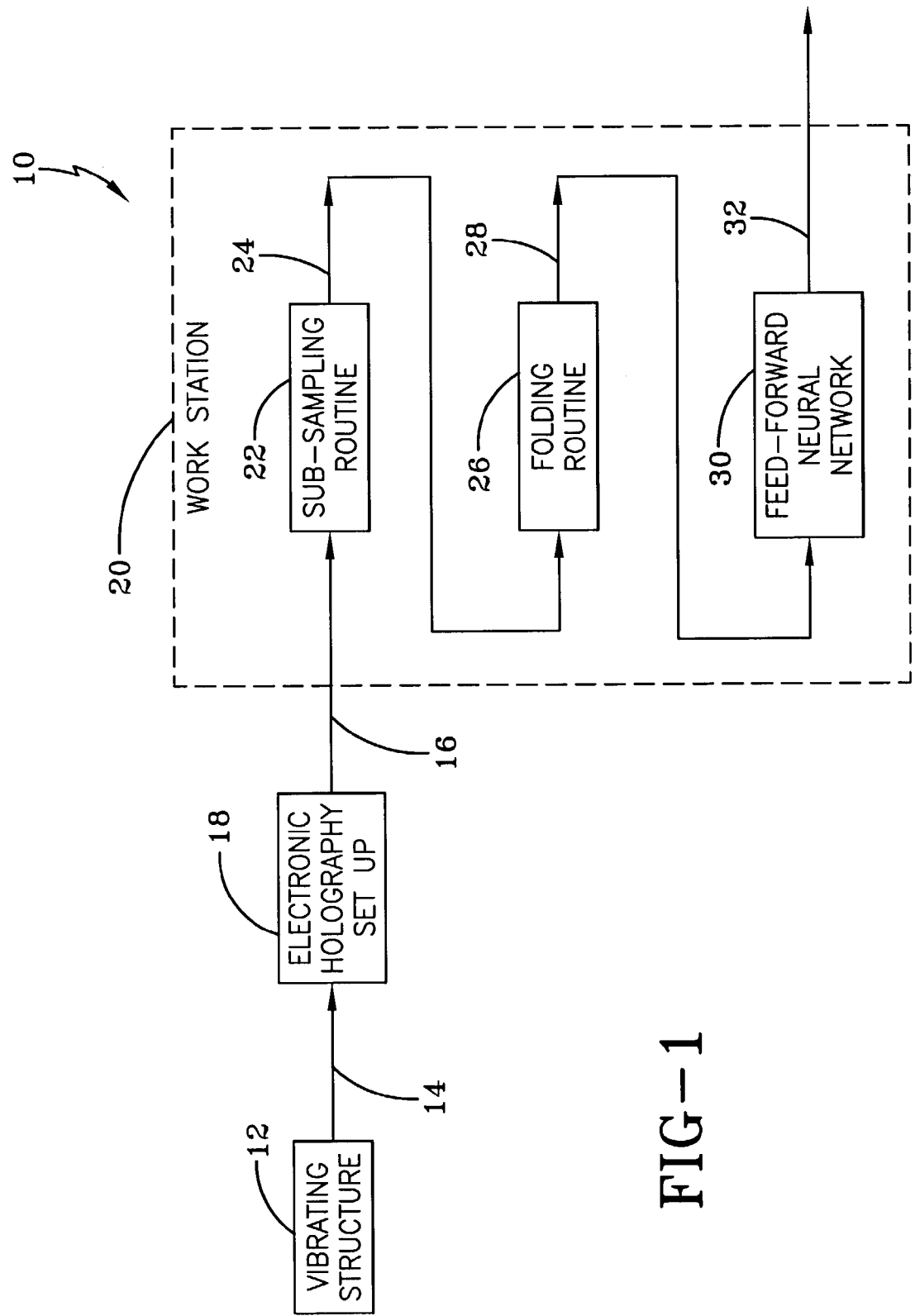
FIG. 1 is a block diagram related to one embodiment of the present invention.

Referring to FIG. 1, there is shown a block diagram of a method 10 of the present invention that uses an artificial neural network for detecting structural damage of a vibrating structure 12. The method 10 is particularly suited to provide training for the neural network and involves a training record. A training record consists of an input and an output. The input is a characteristic pattern recorded of a vibrating structure 12 excited to vibrate at very low amplitude. The structure 12 is excited to vibrate in a normal or resonant mode, and yields a mode shape. A hologram pair 16 is generated using electronic or television holography set-up equipment 18. Television holography set-up equipment 18 is available commercially in more than one form as is known in the art.

As used herein, mode shape is meant to represent the vibration-displacement amplitude distribution of a structure vibrating in a normal mode or to represent the accompanying characteristic pattern. Characteristic patterns are meant to represent the Bessel fringe patterns of time-average holography or the sinusoidal fringe patterns of short-double-exposure holography. Zero-amplitude condition is meant to represent a vibration-displacement-amplitude of zero. Independent speckle-pattern-per-mode is meant to represent a speckle pattern that is uncorrelated with another speckle pattern of the same mode. Speckle-pattern-immunity is meant to represent the insensitivity of the output of a neural network to variations in the speckle pattern. Cross-interference is meant to represent the terms in interference patterns containing the arithmetic products of the field amplitudes of mutually coherent beams of light. Waves are meant to represent light waves or electromagnetic waves, and a number such as 0.8, which is considered herein as a degradable classification index, represents the training output of an output node of a neural network for an undamaged structure. This number decreases for a trained net as damage occurs.

In general, the method 10 provides a training set of television-hologram or electronic-hologram pairs 16 of the vibrating structure 12 comprised of a first number of pixels. The training set, as well as the test set to be described, comprise two time-average holograms, which typically differ by a reference-beam phase shift, known in the art, of π radians having a typical value of 180 degrees. The time-average holograms are typically recorded at a charged-coupled-device (CCD) camera resolution: typically 640× 480 pixels (307,200 pixels). Similarly, the method 10 provides a test set of television hologram pairs 16 of the vibrating structure 12 comprised of the same number of pixels as the training set. The method then delivers the training set of hologram pairs 16 to a sub-sampling routine 22 so as to reduce the first number of pixels thereof to a second number of pixels.

In the practice of this invention for the sub-sampling routine 22 records two time-average holograms at CCD camera resolution: typically 640×480 (370,200) pixels, although higher resolution cameras having more pixels may be used. The holograms differ by the reference-beam phase shift of π radians. In general, pairs of holograms 16 are sub-sampled and the pairs of samples are subtracted, before a characteristic pattern 24 appears at the output of sub-sampling routine 22. More particularly, the practice of this invention sub-samples the two holograms within the large pixels of tiles to extract a few thousand first-pixel pairs. The large-pixel grid is determined from the geometry of the object being inspected, such as the vibrating structure 12. Then the practice of the invention subtracts pixels within the few thousand pairs of first pixels to yield a characteristic pattern consisting of a few thousand pixels. That way, the practice of the invention does not have to evaluate 370,200 differences of the first pixels and then keep only a few thousand to be used as inputs to the neural net. Sub-sampling is done at random coordinates within the large pixels. The geometry of the object being analyzed has coordinates of the first pixels within tiles and the coordinates are set by a random number generator in a manner known in the art. Different coordinates are used for each sub-sampled training record. When the practice of the invention is used from the model-generated patterns to be described hereinafter, there is no need to compute the patterns except at a few thousand points. Therefore sub-sampling is not necessary and the pixels are delivered directly to a folding routine to be described hereinafter. Further, for model generated patterns the characteristic patterns is calculated directly eliminating the need of holograms.

The training set of holography generated characteristic pattern 24 having a second number of pixels are then delivered, via signal path 24 to a folding routine 26, and which is of particular importance to the present invention, to be further described hereinafter, which scales the pixels in accordance with their location in an intensity range and provides a representative output thereof which is delivered, via signal path 28, to a neural network 30, preferably of a feed-forward type. The feed-forward network 30, in response to the scaled pixel output provided by a folding routine 26, yields a first output on signal path 32.

After the first training record (output from the folding routine 26) is developed, then the process is repeated until a predetermined number, to be further described hereinafter, of training sets or records are obtained. This repeat process is also used to obtain a predetermined number of test sets or records. These predetermined number of training records are then delivered to the neural network 30 for training thereof.

The method 10 then delivers the test set of television hologram pairs 16 to the sub-sampler routine 22 so as to reduce the first number of pixels contained in the test set of holography generated characteristic patterns to the second number of pixels. The test set of characteristic patterns 24 having the second number of pixels is then delivered, via the signal path 24, to the folding routine 26, which scales the pixels in accordance with their location in an intensity range and provides a representative output thereof which, in turn, is delivered to the feed-forward neural network 30, via signal path 28. The feed-forward neural network 30 provides an output in response to a scaled pixel output of the test set of holography generated characteristic patterns. The neural network compares the first output with the second output and if the difference of a predetermined amount is determined, then damage to the vibrating structure 12 has been detected.

As will be further discussed, with particular reference to FIGS. 9–16, the folding routine 26 scales the input pixels according to their location in an intensity range rather than their position in the characteristic pattern, which is accomplished in prior art techniques. Folding greatly increases the sensitivity of the feed-forward neural network 30 for detecting changes in a characteristic pattern, which, in turn, greatly increases the sensitivity to detect damage in vibrating structures.

The method 10 provides neural network 30 processing of characteristic patterns of vibrating structures 12 for non-destructive evaluation. A full resolution pattern 24, such as that shown in FIG. 2 for a cracked fan blade, generated using electronic time-average holography of the vibrating structure are effectively sub-sampled by routine 22 before processing by the neural network 30. Full resolution patterns are preferably used for visualization purposes, but the whole pattern thereof is not actually sub-sampled.

Figure 3:
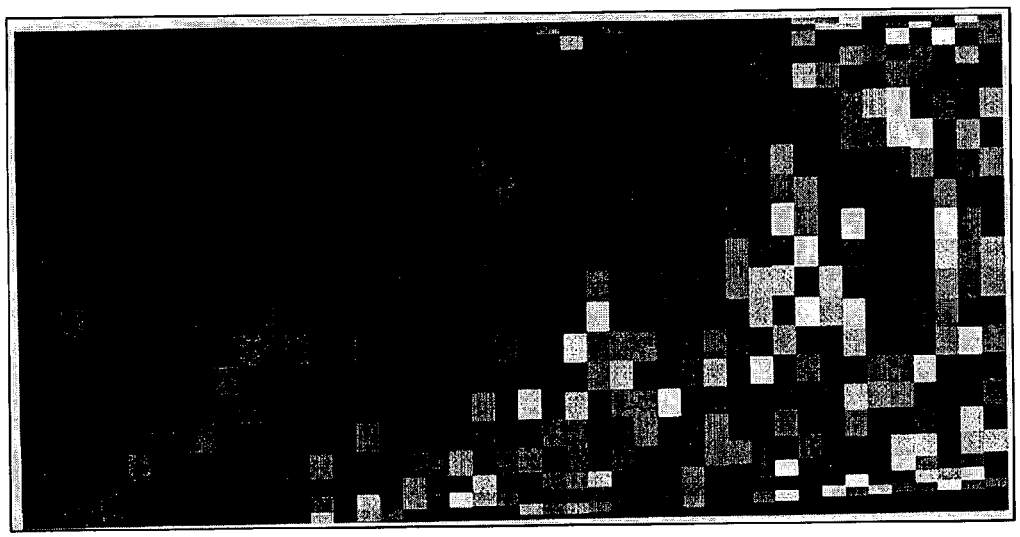
FIG. 3 is a sub-sampled pattern of the characteristic pattern of FIG. 2, wherein the resolution has been reduced by a factor of about 10.
Figure 2:
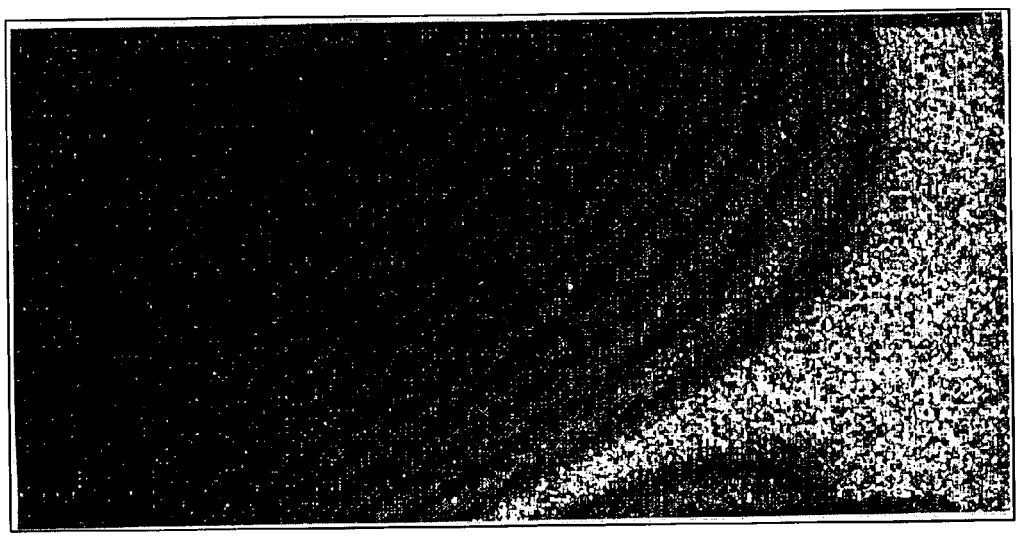
FIG. 2 is a holography generated pattern for a cracked blade.
Figure 4:
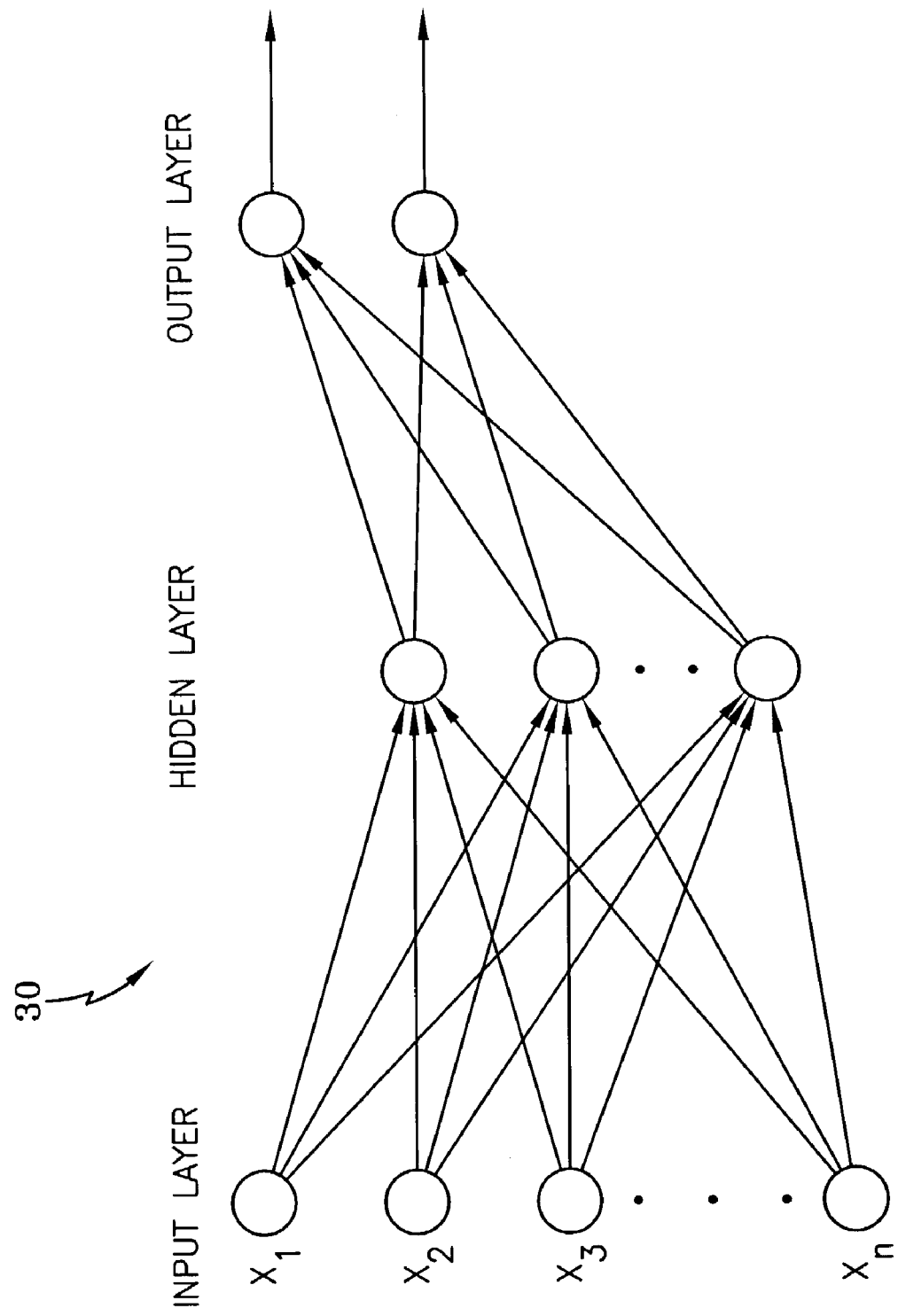
FIG. 4 illustrates a feed-forward neural network having a three (3) layer architecture.

The sub-sampling routine 22, previously discussed, provides a lower resolution pattern containing a few hundred to a few thousand pixels, such as that shown in FIG. 3, as a representation 34 of the cracked fan blade of FIG. 2. Sub-sampling performed by the sub-sampling routine 22 permits rapid recording of a large number of independent speckle patterns for each pattern 16, since there are many full-resolution pixels within a large pixel. It is known that neural networks, such as neural network 30, become insensitive to the details of the speckle pattern, if uncorrelated speckle patterns, equal in number to 10 percent of the number of large pixels, are used to train the neural network to recognize each pattern. More particularly, to achieve desired results, it is desired that the feed-forward network 30 be insensitive to the details of the speckle patterns. Specifically, it is desired that the feed-forward network 30 be sensitive to changes in characteristic patterns 24 at the output of sub-sampling routine 22. The folding routines 26 perform this function by increasing the sensitivity of the feed-forward network 30 to changes in characteristic patterns 24. More particularly, the present invention provides the folding routine 26 to further condition the characteristic patterns 24 before presenting the characteristic patterns 24 to the neural network 30 to achieve the desired sensitivity. The neural network 30 is preferably a feed-forward type having a three-layer architecture shown in FIG. 4.

The method 10 is particularly useful for a non-destructive-evaluation (NDE) providing improved learning performance of the feed-forward neural network 30. The method 10 is used to introduce the appropriate training-record format consisting of a speckled characteristic pattern as input and a so-called degradable classification index (DCI) as output. Also, a structural model for the vibrating structure 12 can be used to create training sets containing exemplars with accurately known structural changes or damage.

The neural network 30 application preferably uses only two (2) holograms to calculate a characteristic pattern and consequently maintains a high sampling rate. The two holograms differ only by a $\pi$ relative phase shift of the reference beam, and the arithmetic difference between holograms equals the characteristic pattern. It should be noted that the feed-forward neural network 30 detects the variations in characteristic patterns as damage occurs.

At low spatial frequencies, characteristic patterns or mode shapes appear on signal path 24 of FIG. 1. These mode shapes are especially sensitive to boundary conditions and are sensitive to internal structural details and changes of vibrating structure 12 being analyzed. The objective of method 10 is to use the neural network 30 to detect and flag such changes associated with the mode shapes and which represent damage to the vibrating structure 12. The neural network 30 uses an output to indicate the extent to which a mode has changed from a training mode as a result of structural changes or damage. The output used is a so-called degradable classification index (DCI). The DCI degrades or changes gradually as the mode shape changes from the original training shape. The DCI is encoded with 2 or 3 neural-net output nodes. The simplest example would consist of the output pair (1,0) for a mode that was completely identical with the training mode and (0,1) for a mode shape that differed completely from the training mode. The output would change gradually between the pair as the mode shape changed gradually.

Training Procedure

In the practice of the present invention for one embodiment an eight step training and non-destructive testing procedure was performed and is given as follows:

First, about five (5) vibration modes were generated and made available on signal path 14 of FIG. 1. These five (5) vibration modes cover a region of interest of the vibrating structure 12 under test. For example, FIG. 5 shows vibration modes 38, 40, 42, 44 and 46 covering a region of suspicious structural integrity between four (4) bolt holes in a cold plate that was being analyzed.

Figure 6:
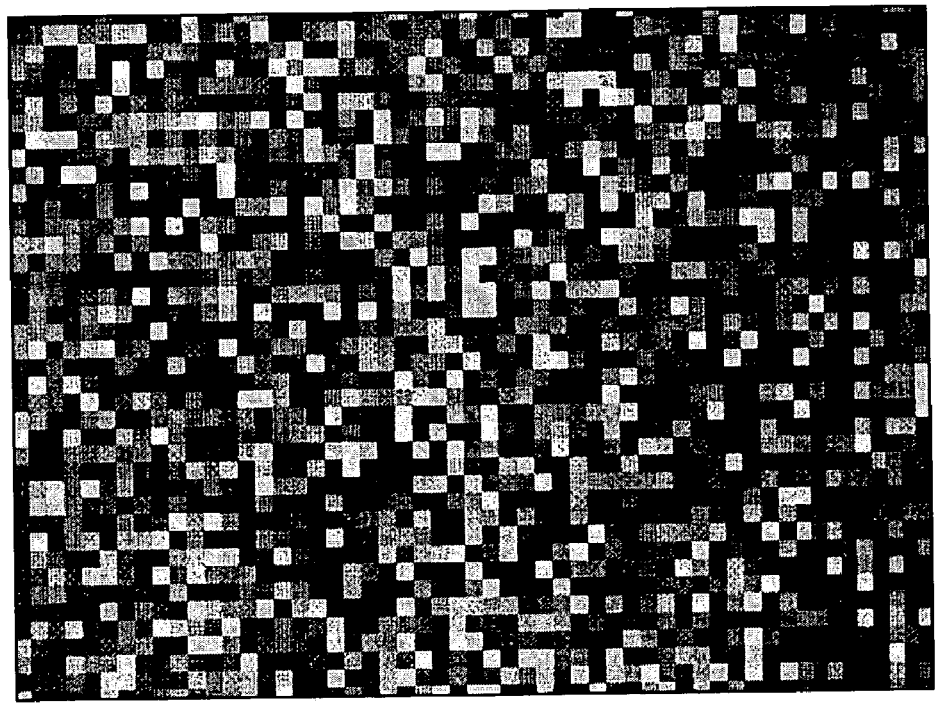
FIG. 6 illustrates a sub-sampled pattern of part of one of the regions of FIG. 5 and also illustrates a zero amplitude condition thereof.

Second, the testing selected three (3) of these modes 38, 40, 42, 44 and 46 together with the zero-amplitude condition, and then collected enough, such as 10 percent of the second number of pixels, uncorrelated speckle patterns for each mode. FIG. 6 shows one speckle-pattern sample 48 for the zero-amplitude condition. There were about 2000 large pixels for this test; hence, about 200 independent speckle-patterns-per-mode were required to train the neural networks for speckle-pattern immunity. The 200 independent speckle patterns per mode is 10% of 2000 large pixels, and is the number of training records per mode. The second number (2000) of pixels are considered herein as being large pixels for one embodiment of the present invention.

Third, the testing selected an appropriate feed-forward neural-net architecture. In the practice of the invention a 3-layer architecture is selected most often, although occasionally a 4-layer neural net architecture will perform best. The input layer requires one node for each pixel. Hence, about 2000 input nodes would be required for the cold-plate example corresponding to the 200 training records per mode, previously mentioned. The number of input nodes is in the range from about 1,000 to about 10,000. The second layer or hidden layer contains very few nodes. It's generally desirable to use as few nodes as possible to minimize the chance of over training. Typically, ten (10) nodes or fewer, such as 6 or 3, are desired for the second layer. The output layer encodes the DCI and normally contains two (2) or three (3) modes. The nodes in the hidden and output layers form a linear combination of their inputs and transform this sum non-linearly in a manner known in the art, wherein a sigmoid transfer function is used typically.

Figure 7:
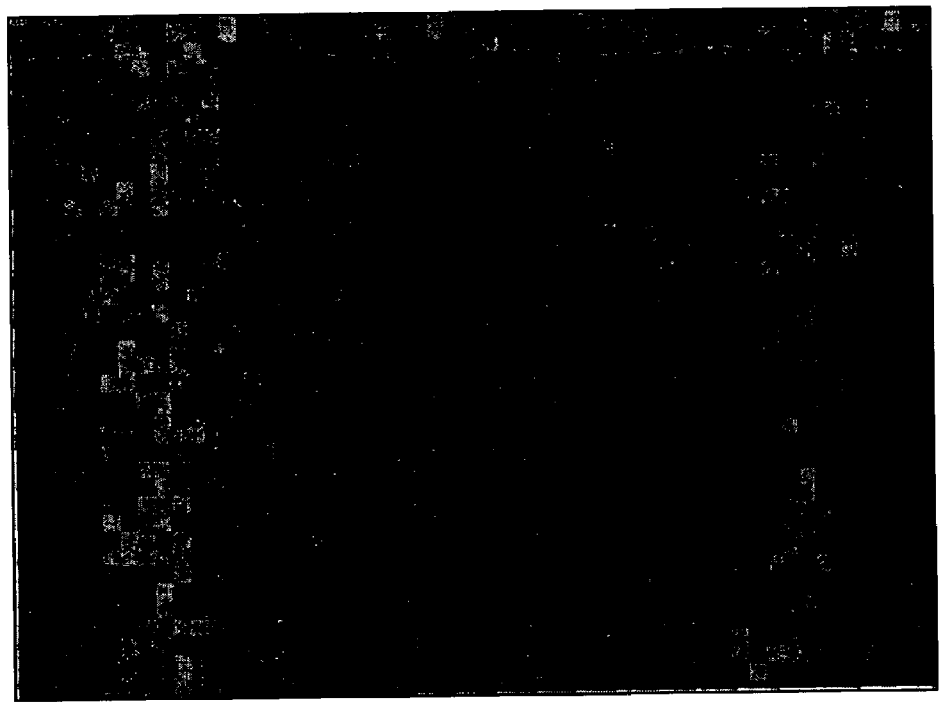
FIG. 7 illustrates a sub-sampled mode related to a particular solid structure of the same region as in FIG. 6.

Fourth, the testing selected the mode to be excited at low amplitude and monitored during a test. More particularly, the testing selected one of the three-(3) modes already selected in step two above. This mode is arbitrarily assigned as DCI (1,0) or (0.8,0.2). The other two modes and the zero-amplitude condition are then each assigned the DCI (0,1) or (0.2,0.8). In some previous applications a third mode was used that were translated to a color code: green; yellow and red. In the present application, only a color code of green or yellow is used. FIG. 7 shows the sub-sampled mode 50 that was actually monitored for the cold-plate being analyzed. Only part of the mode is visible between the boltholes of the cold-plate.

Fifth, the testing then trained the neural net 30 to a RMS error of 0.01 in a manner known in the art. The RMS error is computed from the squares of the differences between the training outputs and the measured outputs for all training records.

Sixth, the testing then defined or selected a value of the output node of the neural network 30 that constitutes a significant change from the training input. The training output of mode to be monitored might be (0.8, 0.2), the 0.8 or DC1 considered to be a large index. The output (0.8, 0.2) is convenient when a sigmoid transfer function is used.

Seventh, the testing then investigated the sensitivity of the now trained neural network 30 to structural changes. Typically, small point loads were applied at strategic locations on the structure 12, and the response of the neural network 30 was noted.

Eighth, the testing then selected a new set of vibration modes first selected in step one, and then the testing repeated steps one through seven and continued therewith if the response of the neural network 30 was not sufficiently sensitive.

It should now be appreciated that the practice of the present invention provides artificial neural networks that process hologram-generated characteristic patterns of vibrating structures that are trained easily to detect damage-induced vibration-amplitude-distribution changes.

A further embodiment of the present invention related to finite-element-model-generated training sets to investigate the conditioning of inputs to optimize the training of neural networks, may be further described with reference to FIG. 8.

Figure 8:
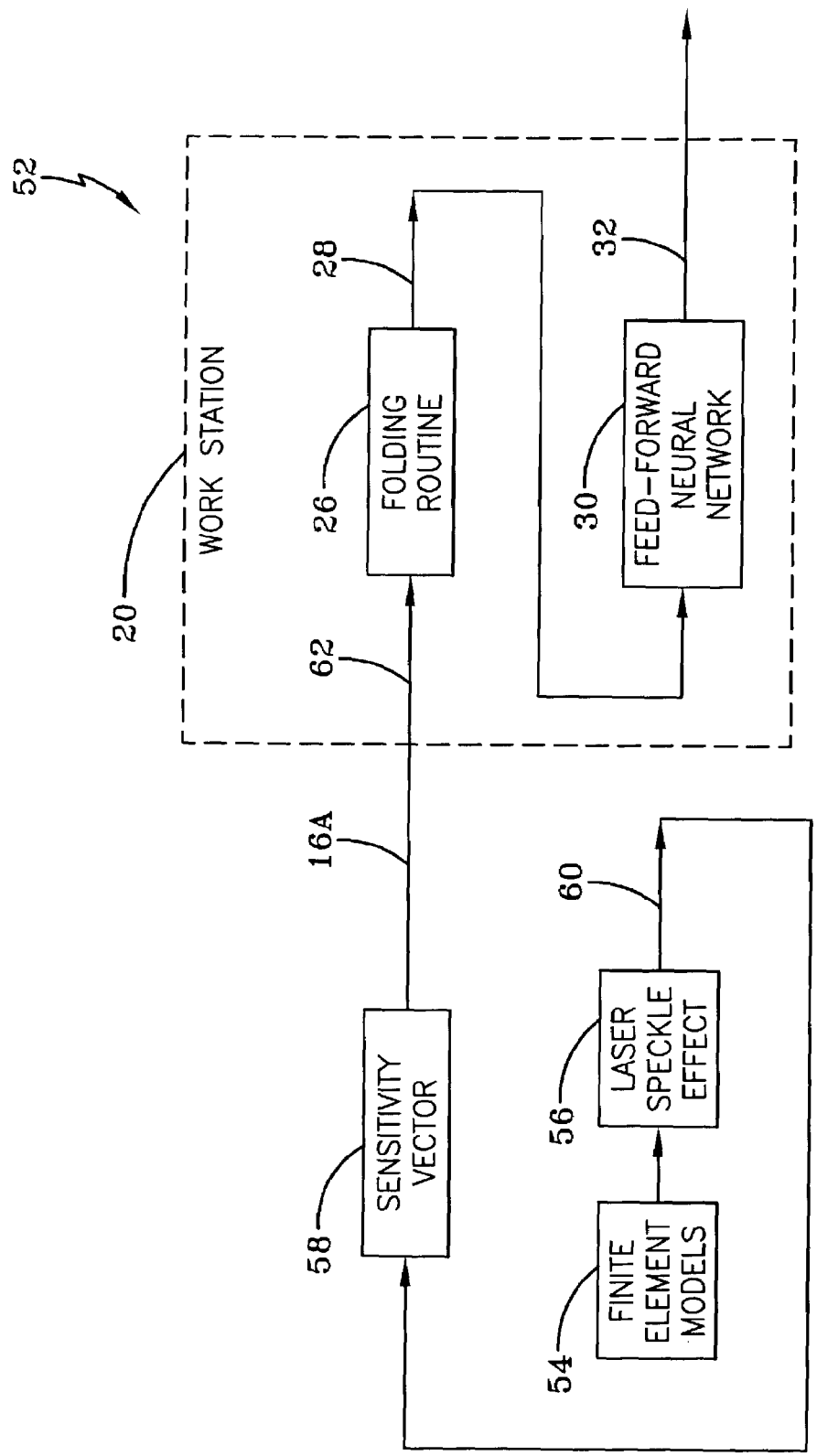
FIG. 8 is a block diagram related to another embodiment of the present invention.

FIG. 8 shows a block diagram 52 of this embodiment of the present invention, which is quite similar to the block diagram 10 of FIG. 1, except for the calculation of model-generated training sets rather than experimental training sets. In the embodiment of 52 of FIG. 8, the characteristic patterns 16A are calculated directly. More particularly, the model characteristic patterns 16A serving as the training sets are computed from a finite-element model 54, a model of the laser specific effect 56 and a model of the sensitivity vector 58, and are delivered to the folding routine 26.

In general, structural finite-element models 54 consist of mode frequencies and displacement distributions and are combined with the laser speckle effect routine 56, as well as with the sensitivity vector 58, via signal path 60 to generate characteristic patterns 16A on signal path 62, and these characteristic patterns 16A, via the folding routine 26, are then used to train the artificial neural network 30.

The practice of the present invention operates on the principle that finite-element models 54 generate changes in patterns that are sufficiently realistic to be used to test the effectiveness of input conditioning on neural network 30 training. A finite-element model 54 is used to generate vibration displacement distributions for undamaged and cracked twisted blades. The size of the crack effect is varied in the model to check sensitivity. The displacement distributions are combined with the quantities provided by the model of the sensitivity vector 58, and the model of the laser speckle effect 56 to generate characteristic patterns 16A that are routed to the folding routine 26, via signal path 62. It should be noted that the sub-sampled routine 22 of the embodiment of FIG. 1 is not needed in the embodiment of FIG. 8 because the benefits thereof are included in the calculated training record. These characteristic patterns 16A are then transformed in various ways to measure the effects of input conditioning on neural-net 30 training and sensitivity.

Figure 10:
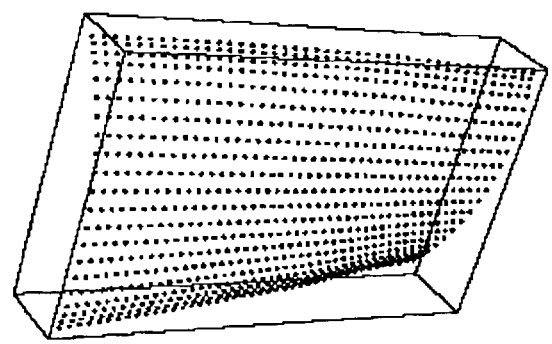
FIG. 10 illustrates a finite-element node-pattern of the blade of FIG. 9.
Figure 9:
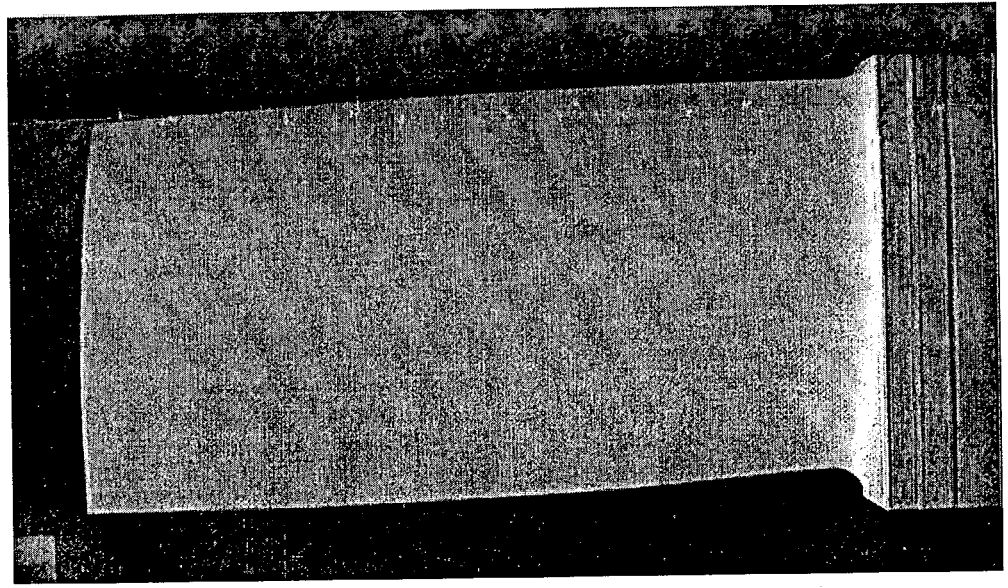
FIG. 9 illustrates a blade, which may serve as a vibrating structure related to the present invention.

A blade 66 and finite-element node pattern model 68, which is part of finite-element model 54 of FIG. 8, are respectively shown in FIGS. 9 and 10. Further, as previously discussed, FIG. 2 shows a characteristic pattern 16 and FIG. 3 shows a sub-sampled pattern 34 from the twisted blade 66. The blade 66 geometry of FIG. 9 is of constant cross-section and has a twist that varies linearly from 0 degrees at the root to 30 degrees at the tip. Blade 66 typical dimensions are chord, 8.72 cm (3.433 in); maximum thickness to chord ratio, 0.037; and span, 15.24 cm (6.0 in). The finite-element models 54 have a 20×42 mesh of quadrilateral elements along the mid-thickness of the airfoil section. The finite-element models 54 tabulate relative vector displacements at 21×43 finite-element nodes. Only the lowest frequency mode predicted at 199 Hz was used in the practice of this invention. The blade 66 material for this prediction was 6061-T6 Aluminum with a Young's Modulus of 66.19 Gpa (9.6×10 psi), a Poisson's Ratio of 0.33, and a Mass Density of 2712.832 kg/m$^3$ (2.536×10$^{-4}$ lbf sec$^2$/in$^4$).

In the practice of the present invention, two finite element models 54 were generated, one with a simulated crack and the other without. The crack was located at the root and extends from 87% to 100% of chord. The blades 66 were structurally modeled as cantilevers by constraining the root nodes in all six degrees of freedom, except in the simulated crack region. The crack was simulated by releasing the constraints for all degrees of freedom at the nodes in the crack's region.

Another feature of the practice of the present invention is called a crack-effect amplification factor f, which was added only to check sensitivity of the neural network 30 to crack effect. More particularly, the change in displacement distribution between the cracked and undamaged blades is multiplied by this factor. When f=1, the model is used as is. When f>1, the optical effect of the crack is greater than predicted by the finite element model 54. When f<1, the optical effect of the crack is less than predicted by the finite-element model 54.

In the practice of the invention it was discovered that the finite-element model 54 should be combined with two (2) optical effects. First, the laser speckle effects 56 needs to be modeled. The simplest model was chosen where the real and imaginary parts of the object-beam amplitude were normally distributed. Random number generators assured uncorrelated speckle patterns. Second, a sensitivity vector K should be included for the sensitivity model 58. The sensitivity vector K can be unfavorable for parts of highly twisted blade, but has little effect on the blade 66 in the practice of this invention.

The finite-element model 54 was used to generate one pixel for each point and for which the displacement was tabulated. A complication evident from viewing FIG. 10 is that the points are non-uniformly placed. However, this complication was handled by software in a manner known in the art.

As previously mentioned, the present invention provided the folding routine 26 for conditioning training sets optimally for training feed-forward neural networks 30 to process characteristic fringe patterns, such as those present in the characteristic patterns 24 of FIG. 1 and the characteristic patterns 16A of FIG. 8. The folding routine 26 is characterized by having abrupt changes in the slopes of its plots in a manner to be more fully described hereinafter with reference to FIGS. 11, 12, and 13. The folding routine 26 allows feed-forward neural network 30 to be trained easily to detect damage-induced vibration-displacement-distribution changes as small as 10 nanometers. The folding routine 26 may be first described by further discussing the data entering into folding routine, via signal path 24 of FIG. 1 and signal path 62 of FIG. 8.

The raw input data entering into the folding routine 26 actually are signed having positive and negative values, whose individual pixels satisfy the expression.

$$\text{Pixel value} = A \cos[\theta] J_0[2\pi K \cdot \delta] \quad (1)$$

where A is a positive random quantity; θ is random variable uniformly distributed from 0 to 2π; $J_0$ is the Bessel function of the first kind and zero order; K is the sensitivity vector previously described; and δ is the vibration displacement amplitude measured in wavelengths of light.

Many transformations of this quantity of expression (1) are possible, but the practice for a long time was to take the absolute value, that is, ignore the positive and negative values. Then pixel values could be arranged from 0 to 255 for visualization and be represented by an eight-bit quantity. The 0 to 255 arrangement is applicable for an eight (8) bit camera, but other cameras are available having twelve (12) bits, which are contemplated by the practice of the present invention. The same absolute values were used to train the neural networks as well.

Figure 11:
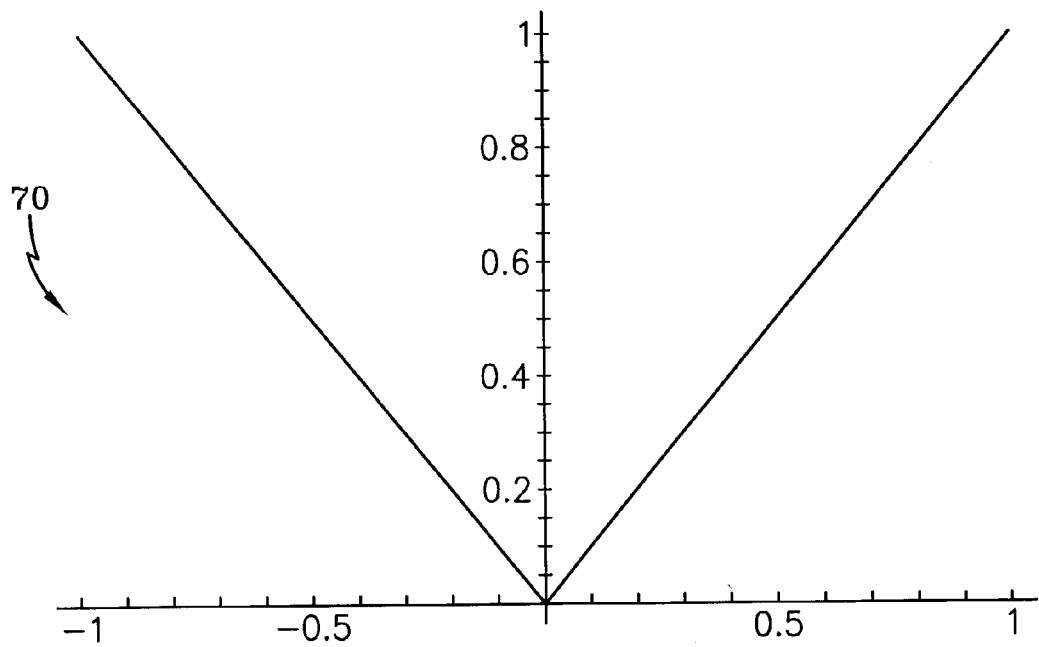
FIG. 11 illustrates a one (1) fold or absolute value associated to the folding routine of the present invention.
Figure 12:
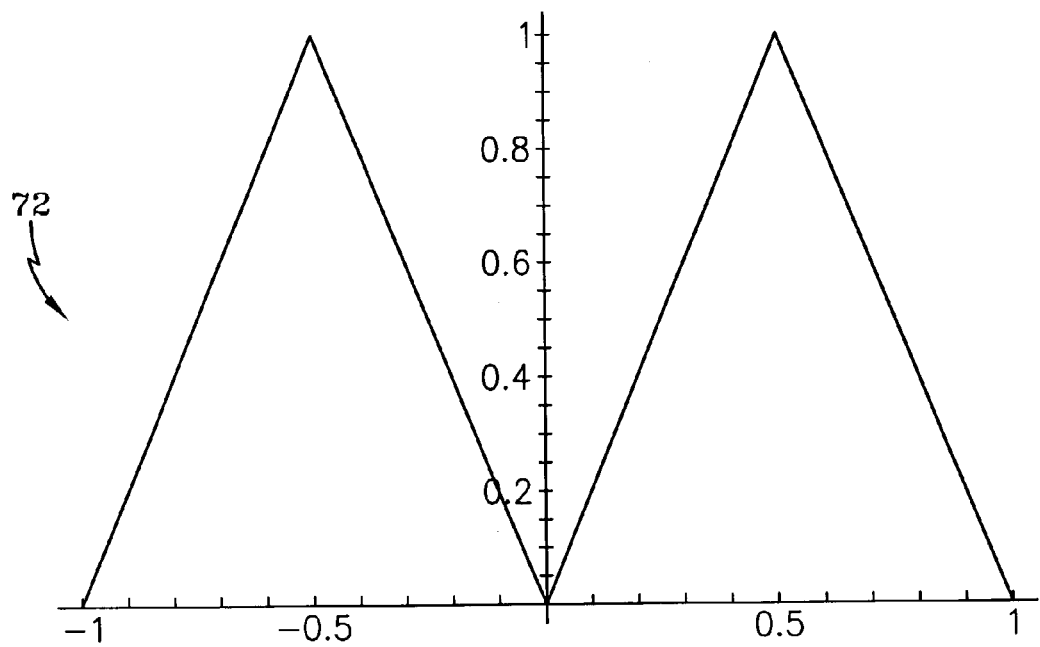
FIG. 12 illustrates a three-(3) fold normal contrast transformation associated with the folding routine of the present invention.
Figure 13:
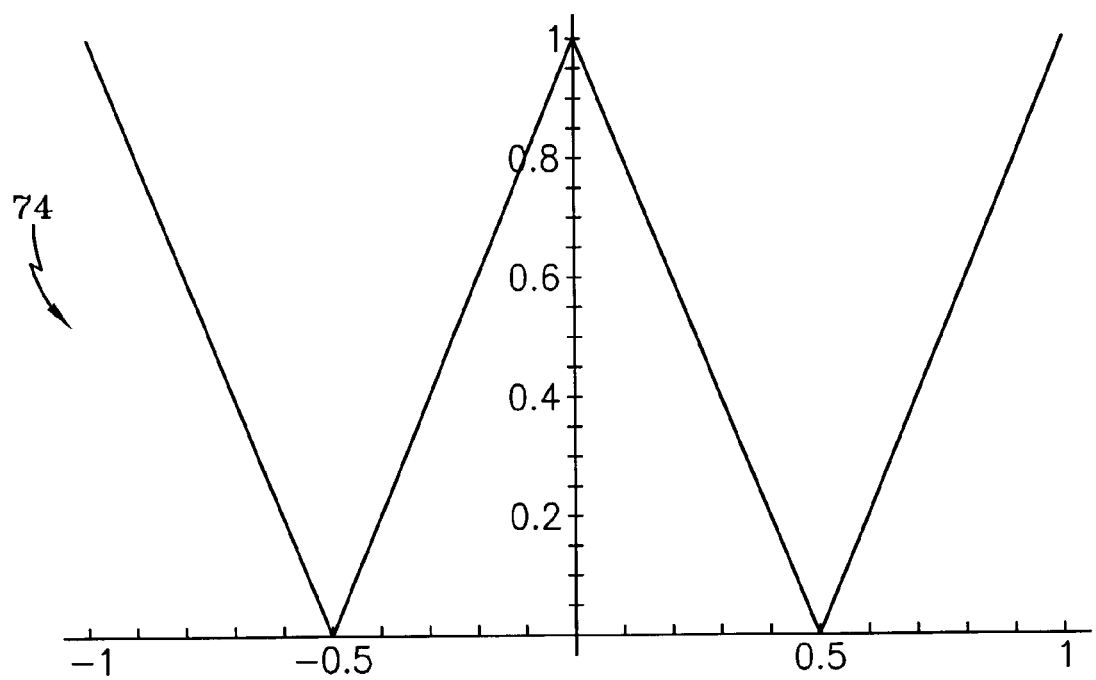
FIG. 13 illustrates a three-(3) fold and a reverse contrast transformation associated with the folding routine of the present invention.

A hyperbolic tangent neural transfer function is used in the practice of the present invention, rather than a sigmoid function for signed inputs typically used in prior art techniques. FIG. 11 shows that the absolute-value transformation 70 is a folding operation about zero intensity. The X (horizontal) and Y (vertical) axes of FIG. 11, as well as FIGS. 12 and 13 respectively illustrate untransformed characteristic pattern values and the transformed characteristic pattern value. It should be noted that inputs to the feed-forward network 30 are scaled or normalized in the range [−1, 1] or [0, 1]. In relative terms, intensities in the range [−1,0) are transformed into the range [1,0), and intensities in the range [0,1] are transformed identically to [0,1]. With reference to FIGS. 11, 12, and 13, the raw characteristic pattern value is read on the horizontal axes and the corresponding transformed value is given on the vertical axes. It was recognized that this symmetrical process could be continued. For example, FIG. 12 shows a transformation 72 of [−1.0–0.5] into the range [1.0,0], a transformation of [−0.5,0] into the range [0,1.0], a transformation of [0,0.5] into the range [1.0,0], and a transformation of [0.5,1.0] into the range [0,1.0]. It was discovered that feed-forward networks 36 trained with this folded data learned more easily than nets trained with the absolute value, and that learning can improve as the number of folds increases. Folding can be made non-symmetrical and non-uniform. The symmetrical case requires that the number of folds N be odd. As used herein, N=0 corresponds to unfolded, signed characteristic patterns and N=1 corresponds to the absolute value as shown in FIG. 11. FIG. 12 has N=3. Folding can also be accompanied by a contrast reversal as in FIG. 13 showing a transformation 74. In general, transformations may be defined as having normal contrast when dark fringes remain dark. Normal contrast requires that zero intensity be transformed to zero.

Folding, performed by routine 26 of FIGS. 1 and 8, is an intensity dependent transformation. For comparison, when another transformation, such as that of the prior art, called a min-max is used, all the intensities in the training set at each point in the characteristic pattern are tabulated. The difference between the minimum and maximum intensities at each point is then used to scale the data into the full input range of the neural network 30. That range typically is [0.2, 0.8] for a feed-forward net that uses a sigmoid transfer function. The min-max table, unlike folding, will scale even a dark fringe into the full input range of the neural network 30.

In the practice of the invention, training records that were treated with the folding routine 26 were used. Training sets were generated for maximum vibration amplitudes of 1.0 wave, 5.0 waves and 64.0 waves, and for crack-effect amplification factors f=1.0 and f=0.1. Recall that f=1.0 refers to the finite-element model 54 generated cracks, and f=0.1 refers to crack-effects 10 times smaller. One wave equals 1 wavelength of light. Training and test sets were generated for 0, 1, 3, 5, 7, and 9 folds, where N=0 represents the signed, unfolded data. The training and tests sets have uncorrelated speckle patterns. The N=0 case was also used to train a neural network 30 with min-max scaling for comparison.

The same neural-net architecture was used for all tests. The feed-forward neural network 30 had an input layer containing 903 nodes, a hidden layer containing 5 nodes and an output layer containing 3 nodes to encode the DCI. One of the 3 output nodes was intended as a no-decision indicator, but was not used for this study, where it was clamped to 0.2. The neural network 30 was always trained with 11,000 back-propagation iterations. After training, RMS errors were measured for both the training and test sets. The identification error rate was also noted. An identification error was declared, if the maximum node indicated an output below 0.6. Note that the training value of a maximum node is 0.8. The DCI triple (0.8, 0.2, 0.2) was used as the training value for the undamaged case, and the DCI triple (0.2, 0.2, 0.8) was used as the training value for the cracked case. The damaged and undamaged structures represent two classes, and for such an application a feed-forward neural network 30 is preferably selected having a three layer architecture with first, second and third layers.

Figure 14A:
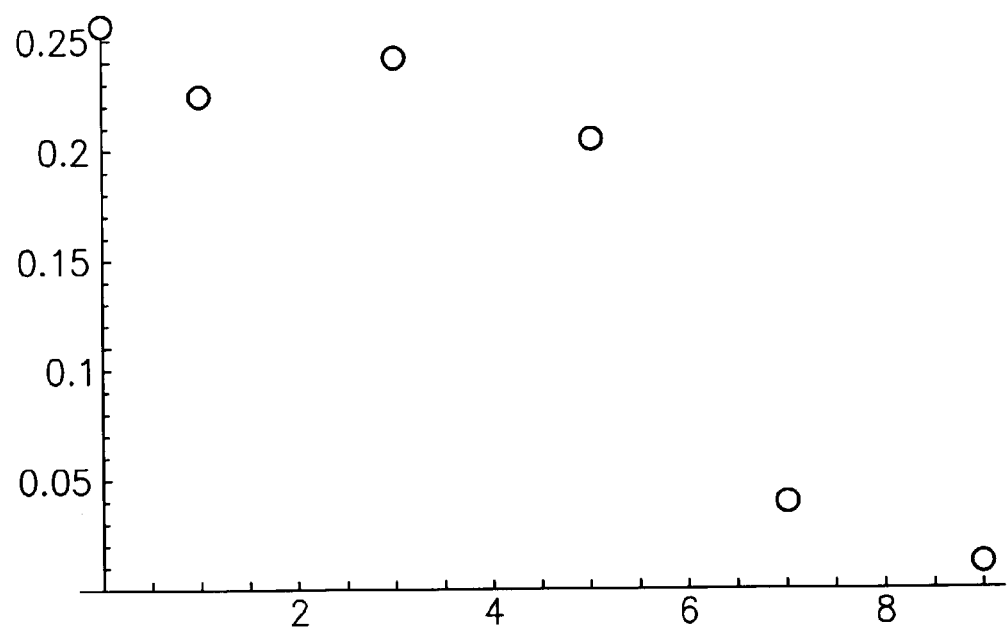
FIG. 14 is composed of FIGS. 14A, 14B, and 14C, respectively showing the training error, test error, and percentage error rate involved in the performance of the folding routine for a excitation amplitude of 0.5 waves and a crack-effect amplification f=0.1.
Figure 14B:
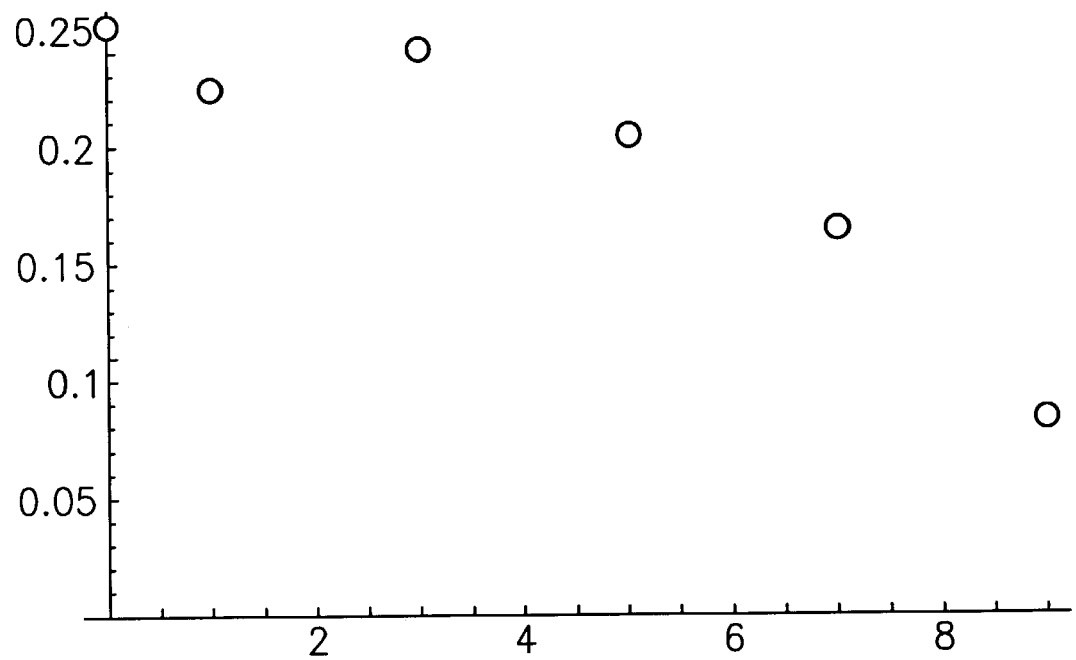
Figure 14C:
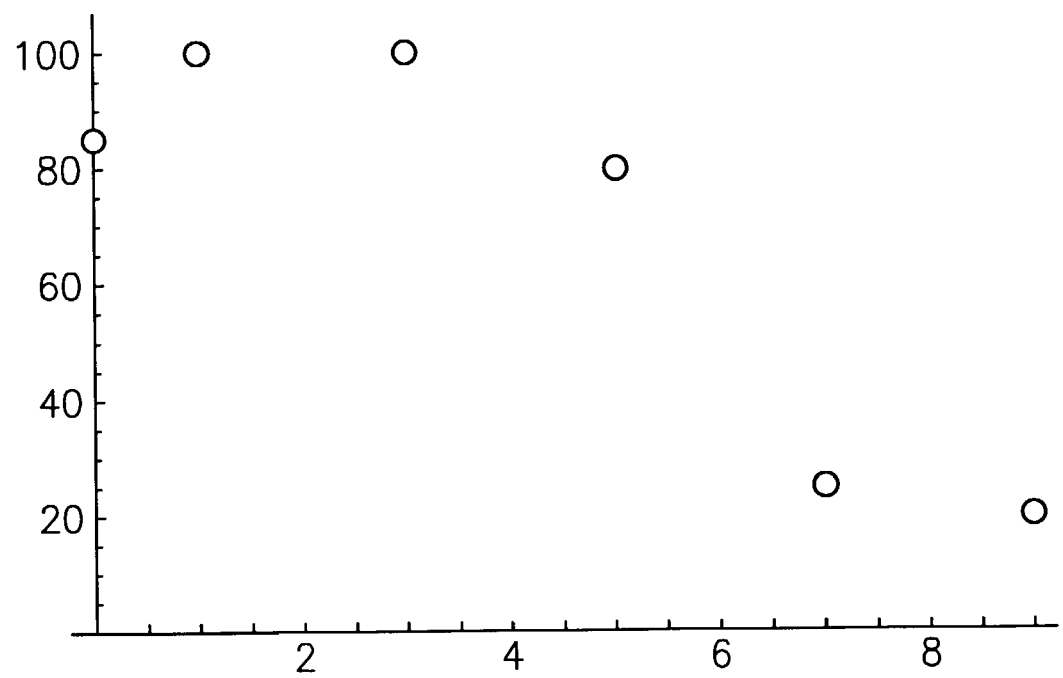

The results of the testing may be further described with reference to FIG. 14 which is composed of FIGS. 14A, 14B, and 14C, respectively showing a training error, test error, and percent error rate involved during performance of folding for an excitation amplitude of 5.0 waves and a crack-effect amplification f=0.1. The X and Y-axes of FIG. 14, respectively, illustrate the number of folds and the root-mean-square error.

Figure 15A:
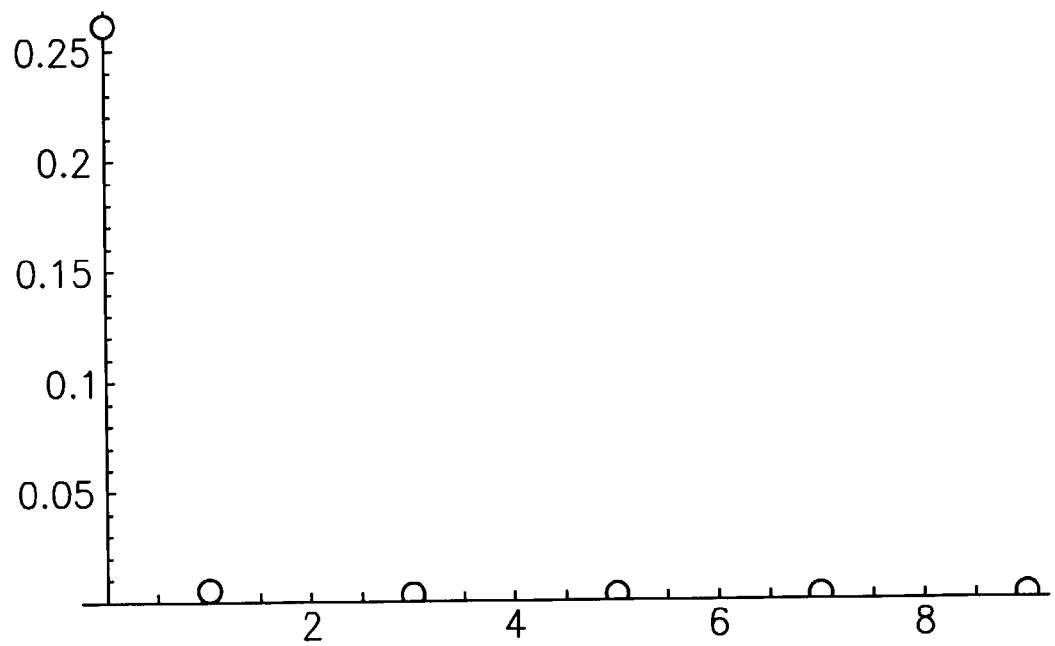
FIG. 15 is composed of FIGS. 15A, 15B, and 15C, respectively illustrating the training error, test error, and percentage error rate associated with the performance of a folding routine of the present invention for an excitation amplitude of 1.0 waves with a crack-effect amplification f=1.0.
Figure 15B:
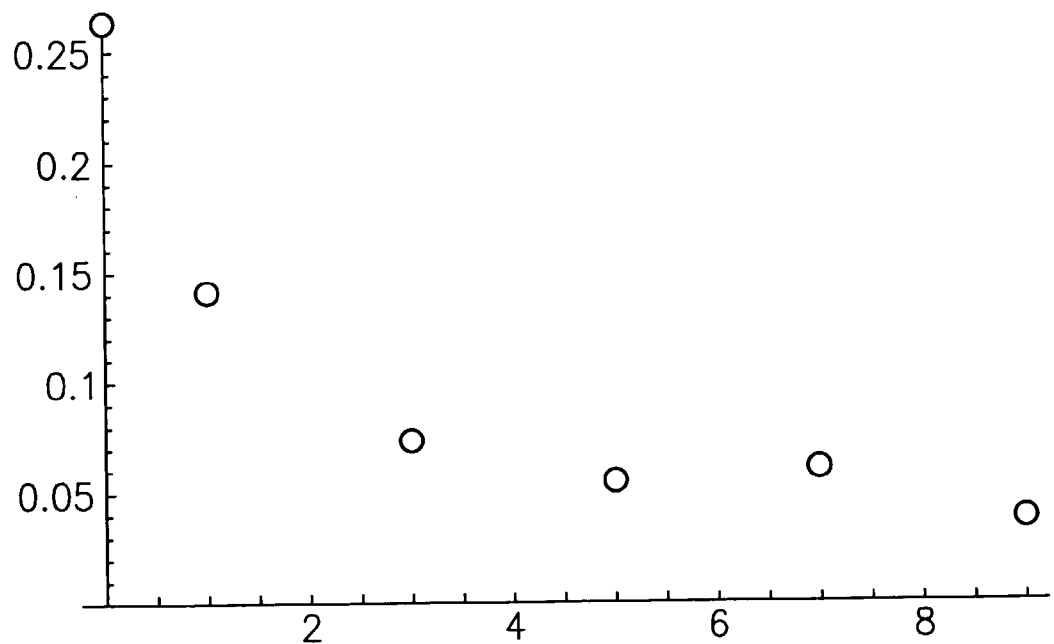
Figure 15C:
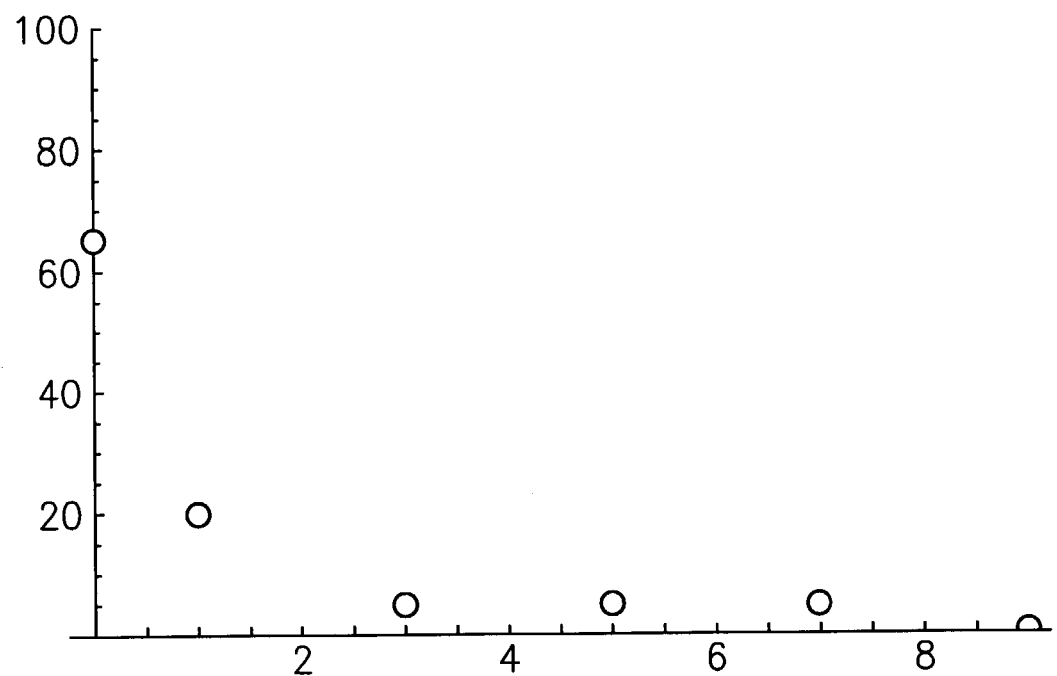

FIG. 14 clearly shows the effectiveness of folding in improving the performance of a feed-forward neural network 30. The neural network 30 does not train at all until there are 7 folds, and the 9-fold case performs better than the 7-fold case. The same result pertains to other combinations of crack-effect amplification and vibration amplitude and may be further described with reference to FIG. 15 composed of FIGS. 15A, 15B, and 15C, respectively showing the training error, test error, and percent error rate all given as a root-mean square (RMS) quantity. FIG. 15 shows the performance result for an excitation amplitude of 1.0 wave and a crack-effect amplification factor f=1.0. Nine folds are required here for a 0% error rate; however, the error rate is down to 5% at 3 folds.

Figure 16A:
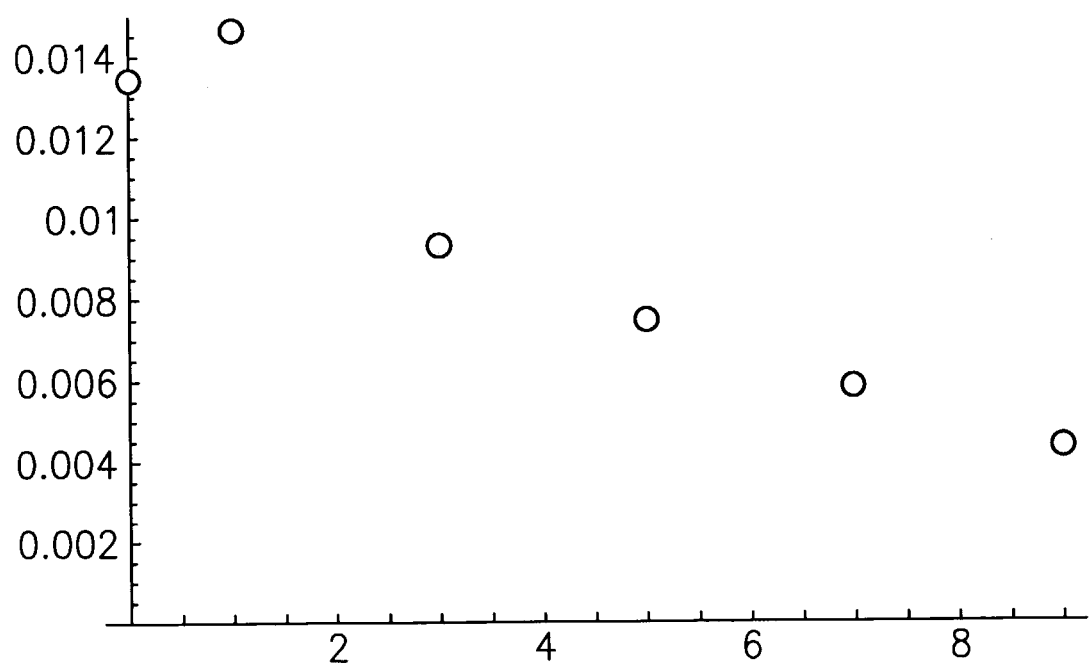
FIG. 16 is composed of FIGS. 16A, 16B, and 16C, respectively illustrating the training error, test error, and percentage error rate associated with the performance of the folding routine of the present invention for an excitation amplitude of 64.0 waves and a crack-effect amplification f=1.0.
Figure 16B:
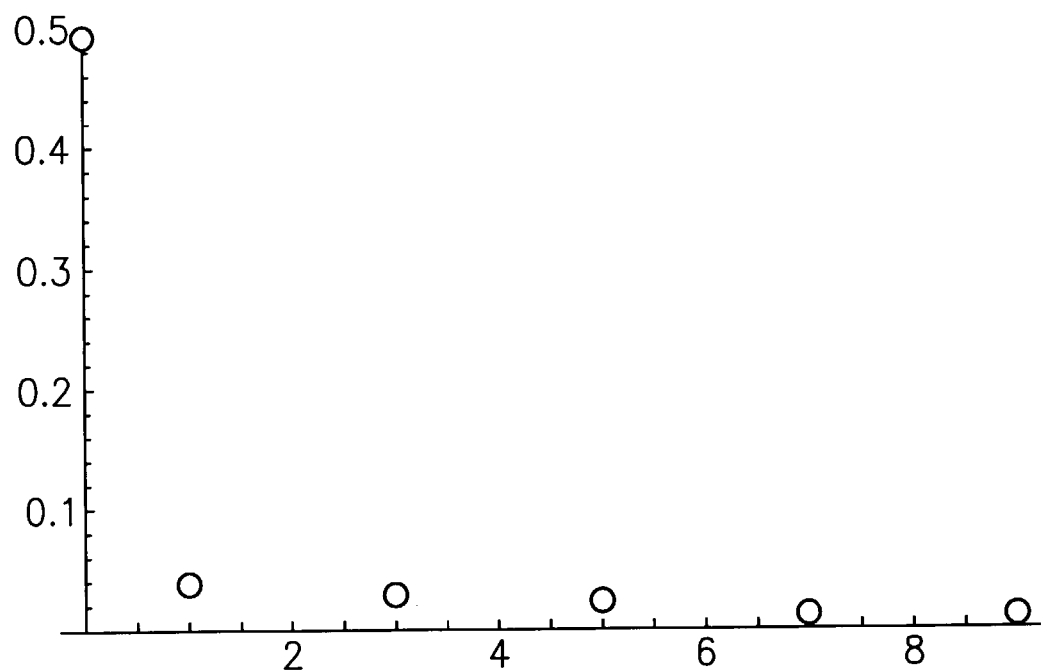
Figure 16C:
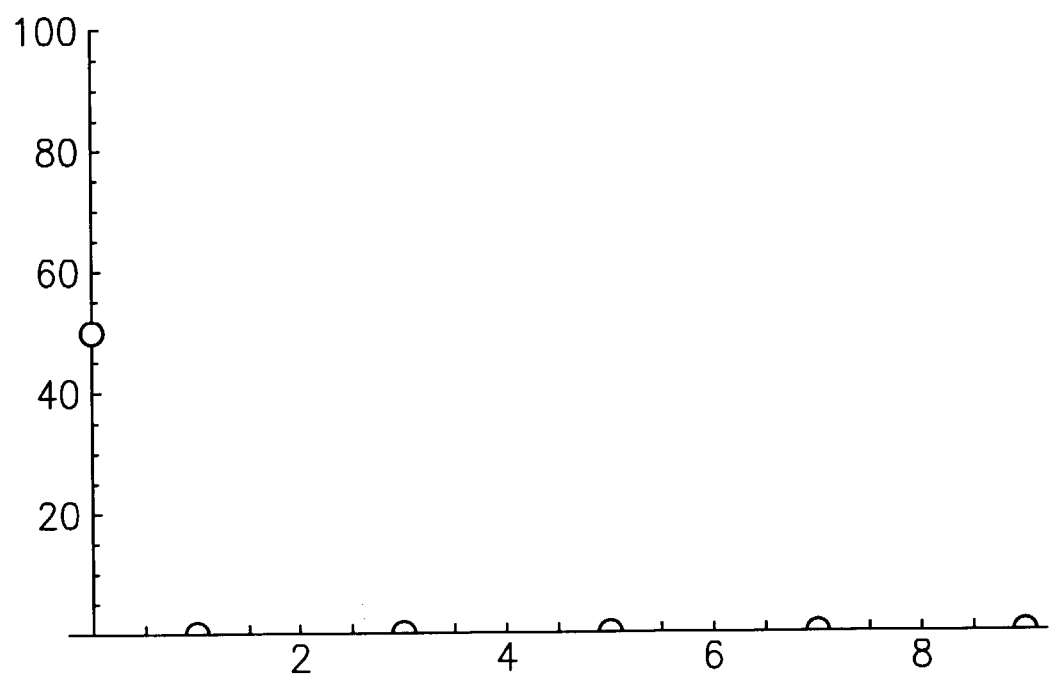

In general, the performance of the feed-forward net improves for large vibration amplitudes and which may be further described with reference to FIG. 16 composed of FIGS. 16A, 16B, and 16C, respectively showing the associated training error, test error and percent error rate, wherein the training and test errors are given as RMS quantities and percent error rate is shown as a percent. FIG. 16 shows the performance result from an excitation of 64.0 waves and a crack-effect amplification factor of f=1.0.

In general, the unfolded case (N=0) does not perform well or even adequately. Furthermore, min-max table scaling does not help. Min-max scaling of the 64.0 waves, f=1.0 case yields a training error of 0.036, a test error of 0.9916, and an error rate of 80 percent.

FIG. 14 clearly shows not only that folding improves the performance of the feed-forward neural network 30, but also that folding is absolutely essential for training in some cases. Neither the signed characteristic pattern (N=0), nor the absolute value (N=1) used most often for training neural networks in the past, were able to train the neural network associated with FIG. 14.

In the practice of the invention a neural network 30 was trained for f=0.01 and a vibration amplitude of 64.0 waves. Nine folds (N=9) were employed. The neural network 30 was allowed to develop a minimum RMS training error of 0.01. The test RMS error, that is, the error associated with the test records, was fairly high (0.2504), but the actual identification error rate was only 20 percent. The large test error was contributed mainly by values of the large node greater than 0.8, resulting still in largely correct identifications. Hence, this neural network 30 for this large test error training-set combination probably was performing at the limit of detection. A symptom of impending neural network 30 failure is an increasing test-error. Complete failure occurs when the training error increases to a large value such as 0.25. The damage of a vibrating structure 12 detected in the practice of the invention would have produced a maximum change in the displacement distribution of less than 10 nanometers.

It should now be appreciated that the present invention provides a folding routine 26, which greatly improves the performance of feed-forward neural network 30 for learning speckle characteristic pattern training records and is beneficial for learning to differentiate training records corresponding to small structural changes. Vibration-displacement-distribution changes as small as 10 nanometers can be detected by the practice of the present invention at the maximum-difference point.

The invention has been described with reference to preferred embodiments and alternates thereof. It is believed that many modifications and alterations to the embodiment as discussed herein will readily suggest themselves to those skilled in the art upon reading and understanding the detailed description of the invention. It is intended to include all modifications and alterations insofar as they come within the scope of the present invention.

I claim:

1. A method of training an artificial neural network for detecting damage of a vibrating structure, said method comprising the steps of:
   a) recording two time-average holograms of a vibrating structure each comprised of a first number of pixels;
   b) providing tiles serving as large pixels predetermined from the geometry of the vibrating structure;
   c) sub-sampling each of two time-average holograms within said large pixels to extract a second number of pixel for each of said two time-average holograms;
   d) subtracting corresponding second pixels of each of said two time-average holograms to generate a sub-sampled characteristic pattern;
   e) delivering said sub-sampled characteristic pattern to a folding routine which scales the second pixels comprising said sub-sampled characteristic pattern in accordance with said second pixels locations in an intensity range and provides a representative output to serve as a training record;
   f) repeating said steps a), b), c), d) and e) until a predetermined number of training records are obtained; and g) delivering said predetermined number of training records to train an artificial neural network, said artificial neural network being trained to compare the characteristic patterns comprising said training records against each other with differences therebetween being indicative of detecting said damage of said vibrating structure.

2. The method according to claim 1, wherein said two time-average holograms are recorded on a charge-coupled-device (CCD) camera and wherein said first number of pixels comprise 307,200 pixels.

3. The method according to claim 1, wherein said second number of pixels is in the range from about 1000 to about 10,000.

4. The method according to claim 3, wherein said second number of pixels is about 2000.

5. The method according to claim 3, wherein said predetermined number of training records is about 10% of said number of said second pixels.

6. The method according to claim 5, wherein said training records include two classes, respectively corresponding to damaged and undamaged vibrating structures and wherein said artificial network comprises a feed-forward neural network having a three layer architecture with first, second and third layers, respectively comprising about 1,000 to 10,000 nodes; about 10 to about 3 nodes and about 2 or 3 nodes.

7. The method according to claim 1, wherein said geometry has coordinates within said first pixels and said coordinates are set by a random number generator.

8. The method according to claim 1, wherein said two time-average holograms differ by a reference beam phase shift of $\pi$.

9. The method according to claim 1, wherein said folding routine comprises;
  a) determining a first intensity range of said second number of pixels;
  b) dividing said determined first intensity range into two or more second intensity ranges; and
  c) increasing said two or more second intensity ranges to that of the first intensity range.

10. The method according to claim 9, wherein said second pixels are comprised of eight bits which represent pixel values from 0 to 255 and which individual pixels satisfy the expression:

Pixel value=$A \cos [\theta] J_o [2\pi K \cdot \delta]$ where A is a positive random quantity; $\theta$ is random variable uniformly distributed from 0 to $2\pi$; $J_o$ is the Bessel function of the first kind and zero order; K is the sensitivity vector; and $\delta$ is the vibration displacement amplitude measured in wavelengths of light.

11. A method of using an artificial neural network for detecting damage of a vibrating structure, said method comprising the steps of:
  a) recording two time-average holograms of a vibrating structure serving as a training set and each comprised of a first number of pixels;
  b) providing tiles serving as large pixels predetermined from the geometry of the vibrating structure;
  c) sub-sampling each of two time-average holograms of said training set within said large pixels to extract a second number of pixel for each of said two time-average holograms;
  d) subtracting corresponding second pixels of each of said two time-average holograms of said training set to generate a sub-sampled characteristic pattern;
  e) delivering said sub-sampled characteristic pattern of said training set to a folding routine which scales the second pixels comprising said sub-sampled characteristic pattern of said training set in accordance with said second pixels locations in an intensity range and provides a representative output to serve as a training record;
  f) repeating said steps a), b), c), d) and e) until a predetermined number of training set records is obtained;
  g) delivering said predetermined number of training records to train an artificial neural network, said artificial neural network being trained to compare the characteristic patterns comprising said training set records against each other with differences therebetween being indicative of detecting damage of said vibrating structure, said artificial neural network providing a first output representative of the differences between said training set records;
  h) recording two time-average holograms of said vibrating structure serving as a test set and each comprised of a first number of pixels;
  i) providing said tiles serving as large pixels predetermined from the geometry of the vibrating structure;
  j) sub-sampling each of two time-average holograms of said test set within said large pixels to extract a second number of pixel for each of said two time-average holograms;
  k) subtracting corresponding second pixels of each of said two time-average holograms of said test set to generate a sub-sampled characteristic pattern;
  l) delivering said sub-sampled characteristic pattern of said test set to a folding routine which scales the second pixels comprising said sub-sampled characteristic pattern of said test set in accordance with said second pixels locations in an intensity range and provides a representative output to serve as a training record;
  m) repeating said steps h), i), j), k), and l) until a predetermined number of test set records are obtained;
  n) delivering said test set records to said trained artificial neural network to provide a second representative output from said trained artificial neural network; and
  o) said trained artificial neural network comparing said first representative output against said second representative output to determine if a difference of a predetermined amount exists therebetween, said difference representing said detection of damage to said vibrating structure.

12. The method according to claim 11, wherein all of said two time-average holograms are recorded on a charge-coupled-device (CCD) camera and wherein said first number of pixels comprise 307,200 pixels.

13. The method according to claim 11, wherein said second number of pixels is in the range from about 1000 to about 10,000.

14. The method according to claim 13, wherein said second number of pixels is about 2000.

15. The method according to claim 14, wherein said predetermined number of training set records and test set records is about 10% of said number of second pixels.

16. The method according to claim 15, wherein said training set records and said test set records each include two classes, respectively corresponding to damaged and undamaged vibrating structures and wherein said artificial network comprises a feed-forward neural network having a three layer architecture with first, second and third layers.

17. The method according to claim 11, wherein said geometry has coordinates within said first pixels and said coordinates are set by a random number generator.

18. The method according to claim 11, wherein said two time-average holograms differ by a reference-beam phase shift of π radians.

19. The training method according to claim 18, wherein said second number of pixels is about 2,000.

20. The method according to claim 11, wherein said folding routine comprises;
   a) determining a first intensity range of said second number of pixels;
   b) dividing said determined first intensity range into two or more second intensity ranges; and
   c) increasing said two or more second intensity ranges to that of the first intensity range.

21. The method according to claim 20, wherein said pixels are comprised of eight bits which represent pixel values from 0 to 255 and which individual pixels satisfy the expression:

Pixel value=$A \cos [\theta] J_o [2\pi K \cdot \delta]$ where A is a positive random quantity; θ is random variable uniformly distributed from 0 to 2π; $J_o$ is the Bessel function of the first kind and zero order; K is the sensitivity vector; and δ is the vibration displacement amplitude measured in wavelengths of light.

22. A method of training an artificial neural network for detecting damage of a vibrating calculated structure, said method comprising the steps of:
   a) calculating a characteristic pattern of a vibrating structure serving as a training pattern, said training characteristic pattern comprising pixels;
   b) delivering said characteristic pattern to a folding routine which scales the pixels comprising said characteristic pattern in accordance with said pixels locations in an intensity range and provides a representative output to serve as a training record, wherein said folding routine comprises; i) determining a first intensity range of said second number of pixels, ii) dividing said determined first intensity range into two or more second intensity ranges; and iii) increasing said two or more second intensity ranges to that of the first intensity range; and wherein said pixels are comprised of eight bits which represent pixel values from 0 to 255 and which individual pixels satisfy the expression:

Pixel value=$A \cos [\theta] J_o [2\pi K \cdot \delta]$ where A is a positive random quantity; θ is random variable uniformly distributed from 0 to 2π; Jo is the Bessel function of the first kind and zero order; K is the sensitivity vector; and δ is the vibration displacement amplitude measure in wavelengths of light;
   c) repeating said steps a) and b) until a predetermined number of training records is obtained; and
   d) delivering said predetermined number of training records to train an artificial neural network thereof, said artificial neural network being trained to compare the characteristic patterns comprising said training records against each other with differences therebetween being indicative of detecting damage of said vibrating calculated structure.

23. The method according to claim 22, wherein said calculated characteristic patterns include a finite element model, a model of laser speckle effect and a model of sensitivity vector.

24. The training method according to claim 23, wherein said pixels of said training characteristic patterns are in the range from about 1,000 to about 10,000.

25. The method according to claim 24, wherein said predetermined number of training records is about 10% of said pixels of said characteristic patterns.

26. The method of according to claim 25, wherein said training records include two classes, respectively corresponding to damaged and undamaged vibrating structures and wherein said artificial network comprises a feed-forward neural network having a three layer architecture with first, second and third layers.

27. A method of using an artificial neural network for detecting damage of a vibrating structure, said method comprising the steps of:
   a) calculating a characteristic pattern of a vibrating structure serving as training pattern, said training characteristic pattern comprising pixels;
   b) delivering said characteristic pattern to a folding routine which scales the pixels comprising said characteristic pattern in accordance with said pixels locations in an intensity range and provides a representative output to serve as a training record;
   c) repeating said steps a) and b) until a predetermined number of training records is obtained; and
   d) delivering said predetermined number of training records to train an artificial neural network said artificial neural network being trained to compare the characteristic patterns comprising said training records against each other with differences therebetween being indicative of detecting damage of said vibrating calculated structure, said artificial neural network providing a first output representative of the difference between said training records;
   e) calculating characteristic patterns of a vibrating structure and serving as test characteristic patterns, said test characteristic patterns comprising pixels;
   f) delivering said test characteristic patterns to a folding routine which scales the pixels comprising said test characteristic patterns in accordance with said pixels locations in an intensity range and provides representative outputs to serve as test set records;
   g) repeating said steps e) and f) until a predetermined number of test set records is obtained;
   h) delivering said test set records to said trained artificial neural network to provide a second representative output from said trained artificial neural network; and
   i) said trained artificial neural network comparing said first representative output against said second representative output to determine if a difference of a predetermined amount exists therebetween, said difference representing detection of said damage to said vibrating structure.

28. The method according to claim 27, wherein said calculated characteristic patterns include a finite element model, a model of laser speckle effect and a model of a sensitivity vector.

29. The method according to claim 28, wherein said pixels of said training and test characteristic patterns are in the range from about 1,000 to about 10,000.

30. The method according to claim 29, wherein said second number of pixels is about 2,000.

31. The method according to claim 29, wherein said predetermined number of training set records and test set records is about 10% of said pixels of said training and test characteristic patterns.

32. The method according to claim 31, wherein said training set records and said test set records each include two classes, respectively corresponding to damaged and undamaged vibrating structures and wherein said artificial network comprises a feed-forward neural network having a three layer architecture with first, second and third layers.

33. The method according to claim 27, wherein said folding routine comprises;
 a) determining a first intensity range of said second number of pixels;
 b) dividing said determined first intensity range into two or more second intensity ranges; and
 c) increasing said two or more second intensity ranges to that of the first intensity range.

34. The method according to claim 33, wherein said pixels are comprised of eight bits which represent pixel values from 0 to 255 and which individual pixels satisfy the expression:

$$\text{Pixel value} = A \cos[\theta] J_o[2\pi K \cdot \delta]$$

where A is a positive random quantity; $\theta$ is random variable uniformly distributed from 0 to $2\pi$; $J_o$ is the Bessel function of the first kind and zero order; K is the sensitivity vector; and $\delta$ is the vibration displacement amplitude measured in wavelengths of light.

* * * * *